United States Patent [19]
Edlinger

[11] Patent Number: 5,944,870
[45] Date of Patent: Aug. 31, 1999

[54] METHOD OF MANUFACTURING PIG IRON OR STEEL AND CEMENT CLINKER FROM SLAGS

[75] Inventor: Alfred Edlinger, Baden, Switzerland

[73] Assignee: "Holderbank" Financiere Glarus AG, Glaurs, Switzerland

[21] Appl. No.: 08/718,304

[22] PCT Filed: Feb. 7, 1996

[86] PCT No.: PCT/AT96/00019

§ 371 Date: Sep. 24, 1996

§ 102(e) Date: Sep. 24, 1996

[87] PCT Pub. No.: WO96/24696

PCT Pub. Date: Aug. 15, 1996

[30] Foreign Application Priority Data

Feb. 7, 1995 [AT] Austria ........................... 218/95

[51] Int. Cl.⁶ ............................................. C21B 11/00
[52] U.S. Cl. ............................................. 75/434; 588/207
[58] Field of Search ........................... 75/434; 588/207

[56] References Cited

U.S. PATENT DOCUMENTS

| | | |
|---|---|---|
| 4,396,422 | 8/1983 | Matsuno et al. |
| 5,336,296 | 8/1994 | Lupeiko ................................ 75/434 |
| 5,501,721 | 3/1996 | Edlinger ............................... 75/434 |
| 5,516,357 | 5/1996 | Edlinger et al. ..................... 75/434 |

FOREIGN PATENT DOCUMENTS

| | | |
|---|---|---|
| 769 260 | 12/1971 | Belgium . |
| 605 378 | 7/1994 | European Pat. Off. . |
| 2 172 206 | 9/1973 | France . |
| 26 11 889 | 9/1977 | Germany . |
| 922586 | 4/1963 | United Kingdom . |
| 94/17214 | 8/1994 | WIPO . |

OTHER PUBLICATIONS

Patent Abstracts of Japan, vol. 10, No. 287, (C–375), Sep. 30, 1986, & JP,A,61104013, May 22, 1986.

Piret et al: "Verwertung von LD–Schlacke zur Erzeugung von Portlandzementklinder und Roheisen", Stahl and Eisen, vol. 104, No. 16, Aug. 13, 1984, Dusselforf, DE., pp. 774–778.

*Primary Examiner*—Melvyn Andrews
*Attorney, Agent, or Firm*—Pillsbury Madison & Sutro LLP

[57] ABSTRACT

To produce pig iron or steel and cement clinker from slags it has been proposed to react iron-oxide containing liquid slags, such as, e.g., steelworks slag, with iron oxide carriers, such as, e.g., ores, cinders or the like and lime to a ferrite-containing slag and to reduce the formed ferrite slag in a reduction reactor, such as, e.g., an iron bath reactor, whereupon the sinter phase is discharged as a clinker.

13 Claims, 2 Drawing Sheets

METHOD OF MANUFACTURING PIG IRON OR STEEL AND CEMENT CLINKER FROM SLAGS

This application claims benefit of International application PCT/AT96/00019, filed Feb. 7, 1996.

FIELD OF THE INVENTION

The invention relates to a process for producing pig iron or steel and cement clinker from slags.

BACKGROUND OF THE INVENTION

Prior Art

It has already been known to blow prereduced and at least partially preheated charges into a fluidized layer along with coal, wherein coal is gasified in a fluidized layer under reduction of the charge and pig iron as well as slag are drawn off in the liquid states. These known melting gasifying reactions, as a rule, have been optimized in view of the pig iron output sought. In order to be able to produce cement clinker in addition to pig iron, ore together with a batch of lime have already been charged into the melter gasifier according to an earlier suggestion, the desired cement clinker composition having been adjustable by means of the lime batch. By appropriate adjustment of the basicity of the slag, a suitable starting material having hydraulic properties may be synthetized from a series of slags, which starting material may be used either directly as what is called slag cement or as an additive in cement adjustment or in the production of cement. However, strongly basic slags, such as, for instance LD slags, on grounds of their high iron oxide contents, as a rule, are not suitable directly for further utilization in the production of cement. Taking into account the increasing burden of such steel slags and, in particular, LD slags, by heavy metals, the disposal of such slags also constitutes an ever increasing problem. Above all, the relatively high amounts of steelworks slags incurred to date no longer can be utilized in an economic manner, and taking into account the increasing content of heavy metals it is to be feared that also dumping will be encumbered with ever increasing problems.

Binder additives influencing the setting time, the fatigue strength and other parameters essential to binders, have gained more and more importance in the production of hydraulic binders. Such additives may be used in connection with conventional hydraulic binders, such as, for instance, slag cements or portland cements, to adjust the desired properties.

SUMMARY OF THE INVENTION

The invention aims at providing a process of the initially defined kind by which a number of slags and, in particular, problematic slags, in a particularly simple manner can be converted into valuable hydraulic binders and binder additives at the simultaneous production of pig iron or steel. To solve this object, the process according to the invention substantially consists in that iron-oxide containing liquid slags, such as, e.g., steelworks slag, are mixed with iron oxide carriers, such as, e.g., iron ores, basic lean ores, rolling mill cinders or metallurgical dusts and lime, and the ferrite slag formed is reduced in a reduction reactor under formation of an iron bath and a sinter phase while burning carbon, whereupon the sinter phase is discharged as a clinker. Primarily with liquid steel slag, as incurs in the LD process, relatively low CaO values, in addition to iron oxide values that are too high, are responsible for homogenous clinker structures having the required cristallographic properties, such as, in particular, high alite/$C_3S$ values, not being readily obtainable. By the fact that iron-oxide-containing liquid slags of this kind, such as, e.g., steelworks slag, are mixed with iron oxide carriers, such as, e.g., iron ore and lime, the appropriate cristallographic marginal conditions for the formation of synthetic binder additives or synthetic hydraulic binders have been substantially enhanced. The early strength of cements to a large degree depends on the alite content of appropriate cement clinkers. By controlling the process according to the invention by the addition of iron ores, basic lean ores or the like and lime to iron-oxide-containing liquid slags, it has become feasible to produce cement clinkers having high early strength values. Mixing of the liquid iron-oxide-containing slags with the iron oxide carriers mentioned allows for the formation of a ferrite phase, the mixed slag comprised of iron-oxide-containing liquid slags and iron oxide carriers of the intially defined kind in the following thus being simply denoted as ferrite slag. Such an addition of iron oxide and/or iron oxide carriers results in a strong liquefaction or decrease in viscosity at a substantially constant temperature, whereby a steel contained in an iron-oxide-containing liquid slag, such as, e.g., LD slag, and present in the dispersed form may readily be deposited and drawn off separately. On the whole, a liquid ferrite slag substantially free of steel may be formed in this manner, which is undersaturated only in respect of CaO. It is exactly this undersaturation which is balanced out by the addition of lime, the CaO added being homogenously dissolvable in the slag in the form of calcium ferrites and calcium silicates due to the reduced viscosity. If necessary, also a number of conventional correction substances, such as, e.g. bauxite, may be added on that occasion for the purpose of adaptation to the desired clinker composition, the melt viscosity thus being even further reducible.

By the fact that the slag in the following is reduced under formation of an iron bath and of a sinter phase while burning carbon, it is feasible to reduce ferrite to pig iron and to obtain cement clinker sinter, which stands out for its particularly advantageous phase texture.

If, as in correspondence with a preferred embodiment of the process according to the invention, it is proceeded in a manner that the reduction is conducted until an $Fe_2O_3$ content ranging between 3 and 12 wt. % is reached, it will be ensured that the $Fe_2O_3$ gives rise to the formation of low viscous melting phases or channels between the solid clinker minerals alite and belite in the sinter, the reduced iron droplets thus being able to sediment into the iron bath.. The minimum proportion of $Fe_2O_3$ in the clinker in that case is necessary primarily in order to stabilize the clinker phases in the subsequent cooling procedure. In doing so, the iron bath, in addition to the gasification reactions occurring in the iron bath, also serves as a carrier and transport medium for the solid clinker structures forming. A ferrite reduction carried out directly with solid carbon without any iron bath usually involves practically uncontrollable caking and discharging problems within the clinker reactor. Clinker phases themselves have melting points lying above 2000° C., which cannot be controlled from a technological or economical point of view.

Advantageously, the process according to the invention is further conducted in that the clinkers are resintered in an oxidizing atmosphere. Such an aftertreatment serves to remove the iron droplets, thereby oxidizing dispersed iron and advantageously oxidically binding the same into the clinker phases in the $Fe^{3+}$ form.

The homogenous and low viscous ferrite slag as is formed above the iron bath has the advantages that the carbon monoxide formed in the iron bath can pass through the same and be withdrawn in a simple manner. In a particularly advantageous manner, it is proceeded according to the invention in a manner that iron ore, in particular hematite, is added to a converter slag or LD slag in an amount of from 15 to 30 wt. %. Such an addition of hematite allows for the immediate control of the reduction in view of the requested $Fe_2O_3$ contents, at the same time providing oxygen for directly reducing the carbon dissolved in the iron bath. Furthermore, such an addition of hematite guarantees the appropriate iron bath to form within the reduction reactor.

Advantageously, lime is used in an amount of from 7 to 15 wt. %, based on the initial slag amount. Lime in the form of calcined $CaCO_3$, i.e., CaO, balances out the undersaturation of the steel-free ferrite slag, calcium ferrites and calcium silicates being formed. Advantageously, the mixture of liquid charging slag and ores may be subjected to sedimentation prior to adding the lime batch in order to actually obtain a ferrite slag that is largely free of steel.

To ensure homogenization to the major extent after the addition of lime, it is advantageously proceeded in a manner that the mixture of charging slag, iron oxide carriers and lime is kept at a temperature of above 1450° C., preferably 1500° C., over a period of time of at least 10 minutes for homogenization before introducing the ferrite slag into the iron bath reactor.

The thermal energy required, in principle, may be made available by direct or indirect reduction. Advantageously a combined process is applied, though, wherein a particularly favourable energy balance and an autothermal mode of operation at simultaneously optimum conditions for the production of metal and clinker can be ensured by effecting the combustion of carbon in the reduction reactor both by direct reduction by reaction with the $Fe_2O_3$ of the ferrite slag and by indirect reduction by blowing oxygen or air into the iron bath under the formation of CO, the air or oxygen amount blown in advantageously being calculated such that the portion of indirect reduction makes up between 10 and 20%, in particular approximately about 15%, and the portion of direct reduction makes up 80 to 90%, in particular about 85%.

Further utilization of the generated energy may be effected in that the heating gas formed in the reduction reactor is afterburnt by means of the hot exhaust air from the clinker cooler, such afterburning being applicable, for instance, in calcining $CaCO_3$ and in preheating additives.

DETAILED DESCRIPTION OF PREFERRED EMBODIMENTS OF THE INVENTION

The invention will be explained in more detail by way of an exemplary embodiment as well as a flow chart.

EXAMPLE

A liquid LD slag was used having the following composition

| Component | Portion % |
|---|---|
| $SiO_2$ | 17 |
| $Al_2O_3$ | 1.5 |
| CaO | 42 |
| MgO | 4 |
| MnO | 8 |
| $Fe_2O_3$ | 11 |
| $(Fe)_{met}$ | 8 |

To this slag 22% hematite ($Fe_2O_3$) was admixed, the bath temperature amounted to 1600° C. After a residence time of 10 minutes 8% steel deposited in the liquid state.

After this, 10% quick lime (CaO), based on the starting slag amount, was added to the low viscous slag, the residence time at 1500° C. for homogenization was 20 minutes. This ferrite slag melt then was reduced for 15 minutes at 1500° C. above the iron bath melter gasifier, hence resulting a sinter having the following composition:

| Component | Portion % |
|---|---|
| $SiO_2$ | 18 |
| $Al_2O_3$ | 2 |
| CaO | 58 |
| MgO | 4 |
| MnO | 6 |
| $Fe_2O_3$ | 8 |

This clinker was cooled by air in a conventional manner.

Figure 1:
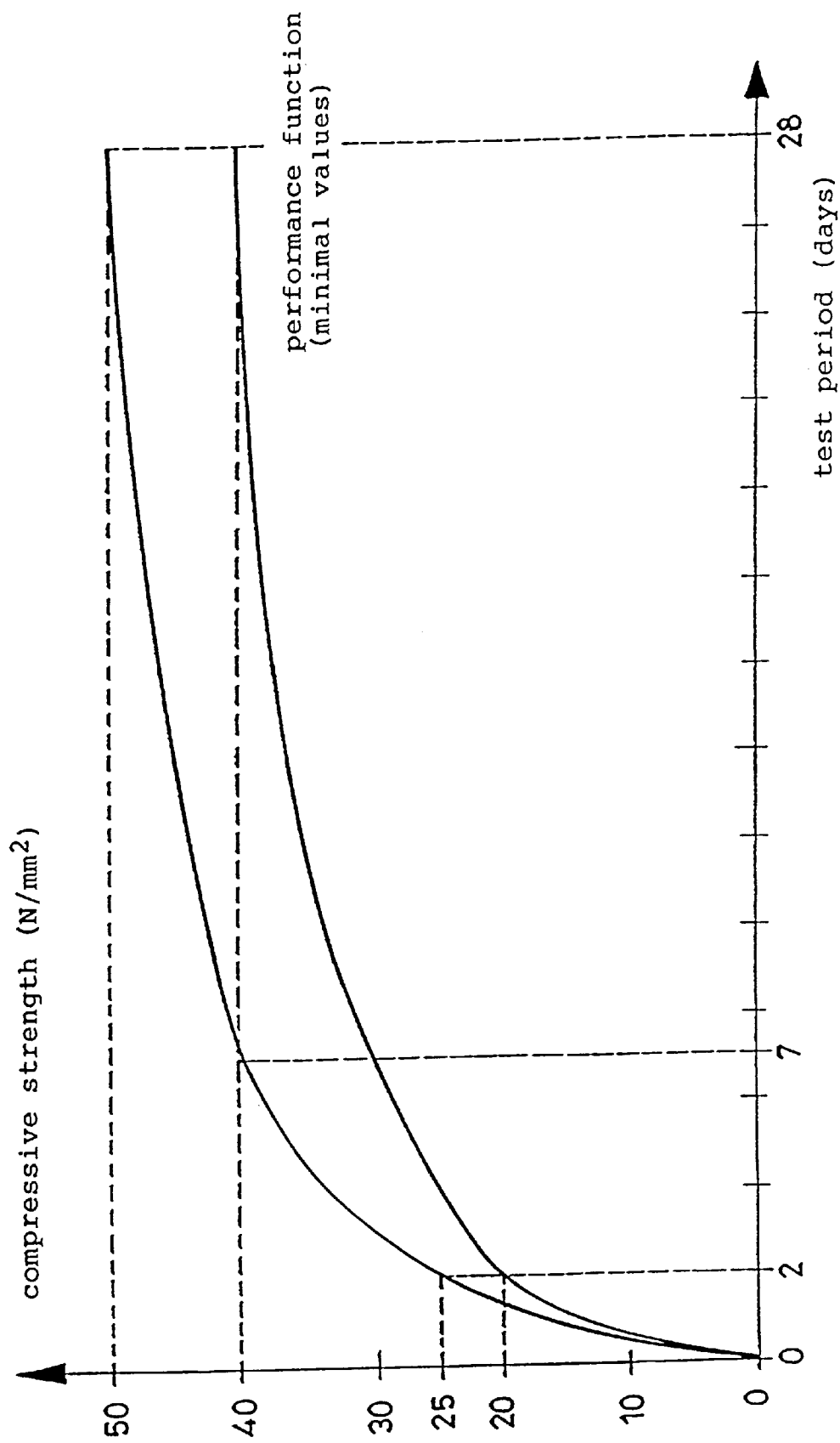
FIG. 1 shows the results of a strength development test with respect to a composition made according to one of the embodiments of the invention.

The clinker obtained was tested for its strength development, yielding the results represented in FIG. 1.

In addition, the clinker obtained also exhibited a distinctly good sulfate resistance.

From the exemplary embodiment indicated above the following substance and energy flow considerations result.

As already pointed out, 68% liquid LD slag, 10% CaO and 22% $Fe_2O_3$ are melted together. After steel tapping a liquid intermediate product containing 33% $Fe_2O_3$ results. Since the clinker forming still is to have an $Fe_2O_3$ content of 8%, 250 kg $Fe_2O_3$ must be reduced per ton of ferrite slag ("intermediate product").

In the overall system, a heat loss by radiation, gas losses, etc. of 50% is expected. This corresponds to a heat deficit of 0.9 GJ/t ferrite slag (F.S.). Add to this the heat demand for raw material preheating ($CaCO_3$, $Fe_2O_3$) as well as calcining ($CaCO_3$=>$CaO+CO_2$). This means an additional heat demand of 0.7 GJ/t ferrite slag. To reduce 250 kg $Fe_2O_3$/t ferrite slag to 175 kg Fe, 0.225 GJ/t ferrite slag must be made available to direct reduction ($Fe_2O_3$ +3C=>3 CO). Hence, the overall heat demand is composed as follows:

| Heat demand | GJ/t ferrite slag | |
|---|---|---|
| HSR 5.3 system loss | 0.9 | |
| Preheating + calcining | 0.7 | |
| Direct reduction | 0.225 | |
| Total heat demand | 1.825 | (~435 Kcal/kg) |

Basically, one may choose from three reduction alternatives, namely 1. complete indirect reduction 2. complete direct reduction 3. direct and indirect reduction plus afterburning ("autothermal process").

1. Complete indirect reduction (gasification)

If the ($Fe_2O_3$) of the ferrite slag is to be reduced to metal iron by means of gas—liquid phase reduction ($Fe_2O_3$) slag+3 CO=>(Fe) iron bath+3 $CO_2$, 130 kg C as well as 173 kg $O_2$ (or 825 kg air), based on 1 ton of ferrite slag, must be supplied to the iron bath (=gasification medium). This causes a heat development of 1.44 GJ/t ferrite slag within the iron bath. 304 kg offgas containing 15% $CO_2$ and 85% CO are formed (after reduction!).

Consequently, the heat balance in this variant presents itself as follows:

| Heat demand | GJ/t ferrite slag |
|---|---|
| System loss | 0.9 |
| Preheating | 0.7 |
| Gasification | −1.44 |
| Heat deficit | 0.16 |

2. Complete direct reduction

If the ($Fe_2O_3$) of the ferrite slag is to be directly reduced by means of carbon dissolved in the iron bath, only 20 kg C are required. 47 kg CO (37.6 $Nm^3$ CO) are formed, requiring 0.225 GJ/t ferrite slag of "reduction heat".

Consequently, the heat balance in this variant presents itself as follows:

| Heat demand | GJ/t ferrite slag |
|---|---|
| System loss | 0.9 |
| Preheating | 0.7 |
| Reduction | −0.225 |
| Heat deficit | −1.825 |

3. Autothermal process (afterburning)

Indirect reduction

As is apparent from the above, an offgas having a very high heating value (85% CO, 304 kg (=$Nm^3$)/t ferrite slag) is formed !!

If this gas is burnt, 2.6 GJ/t are produced, hence far more than is used in the process.

Actually, only 16 $Nm^3$ of offgas would have to be burnt in order for this process variant to be operated "autothermally".

Direct reduction

As is apparent from the above, an offgas having a very high heating value (100% CO, 37.6 $Nm^3$) is formed. If this gas is burnt, 0.376 GJ/t ferrite slag are formed, which still means a heat deficit of 1.825−0.376=1.5 GJ/ferrite slag.

By heat recovery measures (clinker cooling) 1 GJ/t ferrite slag may be recovered such that the heat deficit will be reduced to about 0.5 GJ/t ferrite slag. This heat deficit might be balanced out, e.g., by burning, for instance, waste fuels.

Combined process

By combining direct with indirect reduction and afterburning it is feasible to run a truly autothermal mode of operation.

| Complete indirect reduction plus afterburning yields | | |
|---|---|---|
| 1.44 | GJ/t | gasification heat |
| 2.6 | GJ/t | offgas combustion heat |
| 1 | GJ/t | cooler waste heat |
| 5 | GJ/t | total heat available |
| Complete direct reduction plus afterburning yields | | |
| −0.225 | GJ/t | reduction heat |
| +0.376 | GJ/t | offgas combustion heat |
| +1 | GJ/t | cooler waste heat |
| 1 | GJ/t | total heat available |

These total heat amounts available must be compared to the heat demand:

| System loss | 0.9 GJ/t |
|---|---|
| Preheating/calcining | 0.9 GJ/t |
| Heat demand | 1.6 GJ/t |

Consequently, the completely autothermally operated process advantageously is operated as an indirect reduction process by 15% and as a direct reduction process plus complete afterburning by 85%. The respective consumptions are:

| 36.5 kg | carbon |
|---|---|
| 26 kg | oxygen |

"Afterburning" may, for instance, be effected by means of hot exhaust air from the clinker cooler, see also flow chart.

Figure 2:
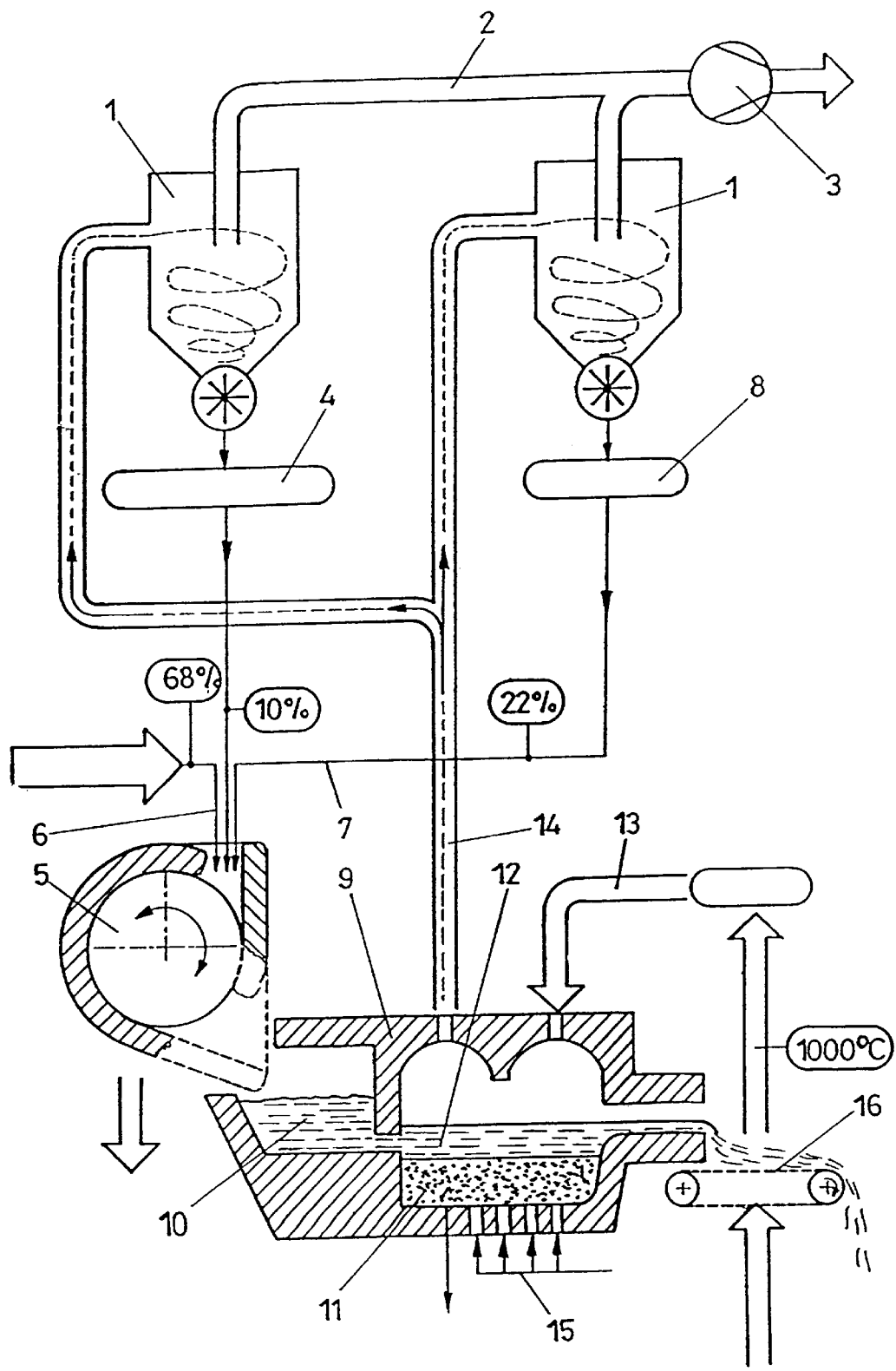
FIG. 2 is a schematic representation of a process according to the invention.

In FIG. 2 the process concept is explained in more detail by way of a schematic representation of an arrangement suitable for carrying out the process. In FIG. 2 a cyclone preheating aggregate, by which discharged limestone is separated from hot offgas, is denoted by 1. The hot offgas is sucked off through an offgas duct 2 and an exhaust fan 3.

Hot meal or quick lime is charged from a container 4 into a ferrite reactor 5 after appropriate preheating. Furthermore, liquid LD slags via supply duct 6 and hot iron oxides via supply duct 7 are introduced into the ferrite reactor 5. The hot iron oxides are taken from a preheated storage reservoir 8, with a cyclone preheater 1 again being provided to separate the finest particles, such as, for instance, scales from rolling mills, from the gas stream of the hot offgas.

After a suitable residence time within the ferrite reactor 5, the liquid ferrite slag mixture reaches an iron bath reactor 9. After having poured off the slag, the crude steel sedimented in the ferrite reactor can be discharged separately by pivoting the ferrite reactor. The ferrite slag 10 present within the iron bath reactor gets into a melting gasifying space, in which a sinter phase 12 is formed above an iron bath 11. Hot air may be fed into the space provided above the sinter phase through a duct 13 to induce afterburning of the carbon monoxide formed. The hot offgas, along with fine solids, through an offgas duct 14 gets into the cyclone preheating aggregate mentioned in the beginning in order to be subsequently discharged via the offgas duct 2 after purification has been completed.

Lances schematically indicated by 15 run into the iron bath, via which carbon and oxygen may be blown in to ensure the appropriate reduction. After the formation of the desired sinter phase, the latter may be discharged onto a cooler 16, wherein the cooling air, after cooling has been effected, may be fed as hot air to the afterburning space of the iron bath reactor or melter gasifier through duct 13. An alite-containing clinker is obtained, which stands out for its particularly good early strength values.

I claim:

1. A process for producing pig iron or steel and cement clinker from slags, comprising:

mixing an iron-oxide containing liquid slag with at least one iron oxide carrier and lime to form a $Fe_2O_3$-containing ferrite slag;

introducing the ferrite slag into a reduction reactor over, and in contact with, an iron bath within the reactor, the iron bath containing carbon sufficient to reduce the $Fe_2O_3$ content of the slag to form a sinter phase and pig iron or steel; and discharging the sinter phase from the reactor as a clinker.

2. A process according to claim 1, wherein the reduction is conducted until the $Fe_2O_3$ content of the ferrite slag reaches a range between 3 and 12 wt. %.

3. A process according to claim 1, further comprising resintering the clinker in an oxidizing atmosphere.

4. A process according to claim 1, wherein the iron oxide carrier is mixed in an amount of from 15 to 30 wt. %.

5. A process according to claim 4, wherein the lime is mixed in an amount of from 7 to 15 wt. %.

6. A process according to claim 1 wherein said liquid slag and iron oxide carrier are combined to form a mixture which is subjected to sedimentation prior to the addition of the lime.

7. A process according to claim 1, wherein the ferrite slag is kept at a temperature above 1450° C. for at least 10 minutes before the ferrite slag is introduced within the reduction reactor.

8. A process according to claim 1, wherein reduction is achieved partially by indirect reduction wherein oxygen or air is blown into the iron bath to combine with the carbon therein to form CO.

9. A process according to claim 8, wherein about 10% to about 20% of the reduction is achieved by indirect reduction.

10. The process according to claim 4 wherein the iron oxide carrier is hematite.

11. A process according to claim 1, wherein said process results in the formation of a heating gas in the reduction reactor.

12. A process according to claim 11, further comprising cooling the clinker with forced air, wherein said cooling results in the production of exhaust gas.

13. A process according to claim 12, wherein heating gas formed in the reduction reactor is afterburnt by mixing the heating gas with the exhaust air.

* * * * *